Nov. 14, 1961 W. V. LOEBENSTEIN 3,009,121

ADJUSTABLE FREQUENCY REJECTION FILTER

Filed May 12, 1961

INVENTOR

William V. Loebenstein

BY David Robbins
John C. Stahl
ATTORNEYS

United States Patent Office 3,009,121

Patented Nov. 14, 1961

3,009,121

ADJUSTABLE FREQUENCY REJECTION FILTER

William V. Loebenstein, 8501 Sundale Drive, Silver Spring, Md.

Filed May 12, 1961, Ser. No. 109,786
2 Claims. (Cl. 333—75)
(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952) Section 266.

This invention relates in general to a filter network and in particular to an adjustable frequency rejection filter.

Very often it is desired to reject a particular frequency. One arrangement in the prior art accomplishing this end is the parallel-T filter network, modified as shown in FIG. 1. This network requires a fixed proportionality among three variable potentiometers that must remain constant over the entire range of adjustment. This is a distinct disadvantage. Again, a particular frequency cannot be removed over the entire range of adjustment without variable attenuation of the D.C. component on which the frequency is superimposed. While other modified parallel-T networks do not have the latter disadvantage, they do not reject perfectly a narrow band of frequencies throughout their entire range.

Accordingly, it is an object of the present invention to provide variable filter network requiring only two potentiometers ganged together and exhibiting proportional resistances over the entire range of adjustment.

Another object is to provide a frequency filter network which will reject a selected A.C. component and provide a fixed attenuation of a D.C. component on which the former is superimposed.

These and other objects are accomplished by connecting a pair of capacitors in series across the first of two ganged potentiometers. The wiper arm of the first potentiometer is coupled to ground through a third capacitor, while the wiper arm of the second potentiometer is connected to a terminal located between the pair of capacitors. Both extremities of the second potentiometer are grounded. When a signal is introduced across the initial extremity of the first potentiometer and ground, an output signal appears across the final extremity of this potentiometer and ground.

Figure 1:
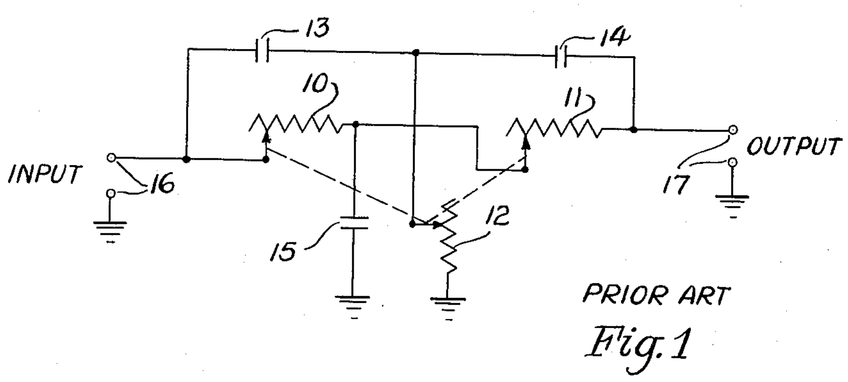
FIG. 1 is a modified parallel-T network in the prior art.

Referring to FIG. 1, potentiometers 10, 11 and 12 are ganged. Capacitors 13 and 14 are connected in series across the wiper arm of potentiometer 10 and the final extremity of potentiometer 11. The wiper arm of potentiometer 12 is connected to a terminal located between capacitors 13, 14, and the final extremity of potentiometer 10 is connected to ground through capacitor 15.

In operation, potentiometers 10 to 12 are adjusted to reject a desired frequency in a signal applied to terminals 16. The output signal appears across terminals 17. When the frequency is superimposed on a D.C. component, the latter will be attenuated in dependency upon the position of the wiper arms of potentiometers 10 and 11.

It can be shown by an analysis similar to that of FIG. 2 below that the following relationship must obtain in FIG. 1:

$$\left(\frac{r_1 r_2}{r_1+r_2}\right)\frac{1}{R}=\frac{C_1+C_2}{C_0} \quad (1)$$

where:

$r_1$=resistance of potentiometer 10;
$r_2$=resistance of potentiometer 11;
$R$=resistance of potentiometer 12; and $C_1$, $C_2$, and $C_0$ are the capacitances of capacitors 13, 14, and 15, respectively.

The significance of this equation will become apparent when it is compared with Equation 8 below.

Figure 2:
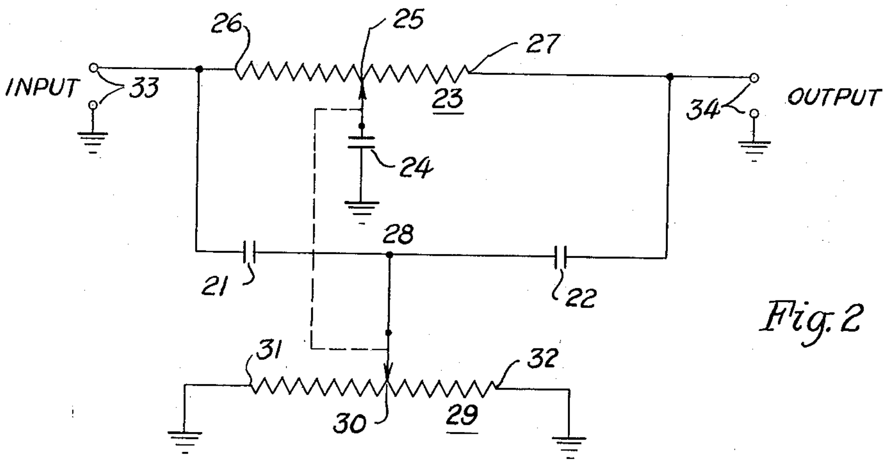
FIG. 2 is a first embodiment.

Referring to FIG. 2, capacitors 21, 22 are connected in series across potentiometers 23 whose wiper arm is grounded through capacitor 24. The point of contact between the wiper arm and resistance of potentiometer 23 is indicated as terminal 25, while the extremities of this potentiometer are indicated as terminals 26 and 27. Terminal 28, located between capacitors 21, 22, is connected to the wiper arm of potentiometer 29 which is ganged with potentiometer 23. The point of contact between the wiper arm and resistance of potentiometer 29 is designated by terminal 30 and the extremities of this potentiometer are designated by terminals 31, 32. The latter are connected to ground.

In operation, potentiometers 23, 29 are adjusted to reject a desired frequency occurring in a signal applied to input terminals 33. The output signal appears across terminals 34.

In analyzing FIG. 2, using the principle that the algebraic sum of the current flowing into a terminal is zero, the following equations may be written:

At terminal 25:

$$\frac{E_{in}-E_s}{x}=\frac{E_s-E_{out}}{2r-x}+j\frac{E_s}{Z_0}$$

At terminal 28:

$$j\frac{E_T-E_{in}}{Z_1}=j\frac{E_{out}-E_T}{Z_2}-\frac{E_T}{\frac{y(2R-y)}{2R}}$$

At terminal 34:

$$\frac{E_s-E_{out}}{2r-x}=j\frac{E_{out}-E_T}{Z_2}$$

Upon regrouping these equations, one obtains:

$$E_s\left(\frac{1}{x}+\frac{1}{2r-x}+\frac{j}{Z_0}\right)-E_{out}\left(\frac{1}{2r-x}\right)=E_{in}\frac{1}{x} \quad (2)$$

$$E_T\left(\frac{2R}{y(2R-y)}+\frac{j}{Z_1}+\frac{j}{Z_2}\right)-E_{out}\frac{j}{Z_2}=E_{in}\frac{j}{Z_1} \quad (3)$$

$$-E_s\left(\frac{1}{2r-x}\right)-E_T\frac{j}{Z_2}+E_{out}\left(\frac{1}{2r-x}+\frac{j}{Z_2}\right)=0 \quad (4)$$

where:

$E_{in}$, $E_{out}$, $E_s$, and $E_T$ are the voltages appearing on terminals 33, 34, 25, and 28, respectively;

$Z_0=\frac{1}{\omega C_0}$, $C_0$ being the capacitance of capacitor 24;

$Z_1=\frac{1}{\omega C_1}$, $C_1$ being the capacitance of capacitor 21;

$Z_2=\frac{1}{\omega C_2}$, $C_2$ being the capacitance of capacitor 22;

$2r$=resistance of potentiometer 23;
$x$=resistance between terminals 25, 26;

$2r-x$=resistance between terminals 25, 27;
$y$=resistance between terminals 30, 31;
$2R$=resistance of potentiometer 29;
$2R-y$=resistance between terminals 30, 32; and
$j=\sqrt{-1}$, the unit of pure imaginary numbers.

Solving Equations 2 to 4 simultaneously for $E_{out}$, setting the imaginary component of $E_{out}$ equal to zero and making the following substitutions:

$$x\frac{R}{r}=y$$

$$Z_1=\frac{1}{\omega C_1}$$

$$Z_0=\frac{1}{\omega C_0}$$

$$Z_2=\frac{1}{\omega C_2}$$

one obtains:

$$\omega_2=\frac{C_1+C_2}{x(2r-x)C_0C_1C_2} \qquad (6)$$

Setting the real component of $E_{out}$ equal to zero and making the above substitutions, one obtains:

$$\omega^2=\frac{r}{x(2r-x)RC_1C_2} \qquad (7)$$

From Equation 7, it can be seen that the range of frequency rejection will vary from $\omega$=infinity, corresponding to $x=0$ or the lowest end of potentiometer 23, to $$\omega^2=\frac{1}{rRC_1C_2}$$

as a minimum, corresponding to the highest adjustment of potentiometers 23, 29.

Equating the right-hand sides of Equations 6 and 7, one obtains upon cancellation:

$$\frac{r}{R}=\frac{C_1+C_2}{C_0} \qquad (8)$$

From Equation 8 it is clear that once resistance of potentiometers 23 and 29, that is $r$ and R, have been selected, it is a relatively simple matter to select capacitors $C_1$, $C_2$, and $C_0$ and adjust or shim capacitor $C_0$, if necessary, to obtain the desired ratio.

The comparison can now be made between Equations 1 and 8, the former relating to the prior art in FIG. 1. In Equation 1, the parallel resistance combination of $r_1$ and $r_2$ must always be as precisely constant as the value of $r$ in Equation 8. Because this is impossible, the prior art cannot attain the same efficiency of rejection over the same range of adjustment as the present embodiment.

Figure 3:
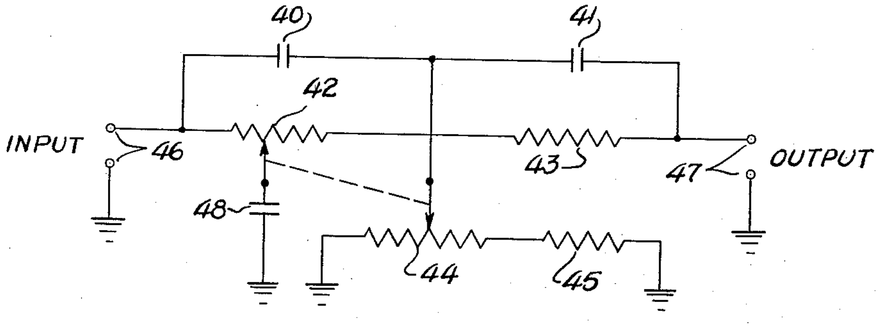
FIG. 3 is a second embodiment of the present invention.

Referring to FIG. 3, capacitors 40, 41 are connected in series across potentiometer 42 and resistor 43. A terminal, located between capacitors 40 and 41, is connected to the wiper arm of potentiometer 44 which is ganged with potentiometer 42. One extremity of potentiometer 44 is grounded, while the other extremity is grounded through resistor 45. Finally, the wiper arm of potentiometer 42 is coupled to ground through capacitor 48.

In operation, as in FIG. 2, potentiometers 42, 44 are adjusted to reject a selected frequency occurring in a signal applied to input terminals 46. The output signal is developed across terminals 47.

The same mathematical relations derived for the embodiment in FIG. 2 obtain for the embodiment in FIG. 3, except that:

$2r$=resistance of potentiometer 42 plus resistor 43; and
$2R$=resistance of potentiometer 44 plus resistor 45.

From Equation 7 it is seen that as potentiometer 29 is varied from one extremity to the other, there will be two points at which a frequency will be rejected. These points are symmetrical around the mid-resistance point of the potentiometer. Therefore, only one-half of the potentiometer need be used and the resistances of potentiometer 42 and resistor 43 may be selected so that each is equal to $r$ and the resistances of potentiometer 44 and resistor 45 may be selected so that each is equal to R.

If potentiometers 42, 44 have values smaller than resistors 43, 45, respectively, the network will not have the fullest range of frequency rejection of which it is capable. If the potentiometers have values larger than their associated resistors, there will be an area of adjustment in which the same frequency could be rejected at two different points of adjustment.

Obviously, many variations and modifications of the present invention are possible in the light of the above teachings. For example, the position of potentiometer 42 and resistor 43 in FIG. 3 may be reversed and the position of potentiometer 44 and resistor 45 may be reversed. It is therefore to be understood, that within the scope of the appended claims, the invention may be practiced otherwise than as specifically described.

What is claimed is:

1. A filter network comprising a first and second potentiometer having a first and second wiper arm, respectively, means for gauging said first and second wiper arm, a pair of capacitors connected in series across only said first potentiometer, a third capacitor having a first and second terminal, said first wiper arm being connected only to said first terminal and said second terminal being connected only to ground, means for connecting said second wiper arm to a terminal located between said pair of capacitors, means for grounding the extremities of said second potentiometer, and means for applying an input signal across one extremity of said first potentiometer and ground and for receiving an output signal developed across the other extremity of said first potentiometer and ground.

2. A filter network comprising first means including a first fixed resistor connected in series with a first potentiometer having a first wiper arm, a pair of capacitors connected in series across said first means, a third capacitor having a first and second terminal, said first wiper arm being connected only to said first terminal and said second terminal being connected only to ground, a second potentiometer having a second wiper arm, means for ganging said first and second wiper arm, means for connecting said second wiper arm to a terminal located between said pair of capacitors, a second fixed resistor having one extremity connected to one extremity of said second potentiometer, means for grounding the other extremity of said second potentiometer and the other extremity of said second fixed resistor, and means for applying an input signal across one extremity of said first means and ground and for receiving an output signal developed across the other extremity of said first means and ground.

References Cited in the file of this patent

UNITED STATES PATENTS

| | | |
|---|---|---|
| 2,354,141 | Purington | July 18, 1944 |
| 2,579,069 | Gordner | Dec. 18, 1951 |
| 2,655,627 | McWade | Oct. 13, 1953 |
| 2,680,232 | Claras et al. | June 1, 1954 |

OTHER REFERENCES

Brickart: Electronic Industries, May 1961, pages 104–109.

UNITED STATES PATENT OFFICE

CERTIFICATE OF CORRECTION

Patent No. 3,009,121 November 14, 1961

William V. Loebenstein

It is hereby certified that error appears in the above numbered patent requiring correction and that the said Letters Patent should read as corrected below.

Column 3, line 23, left-hand portion of equation (6) for "$\omega_2$" read -- $\omega^2$ --; column 4, line 28, for "gauging" read -- ganging --.

Signed and sealed this 17th day of April 1962.

(SEAL)
Attest:

ESTON G. JOHNSON
Attesting Officer

DAVID L. LADD
Commissioner of Patents